United States Patent [19]

Shiki

[11] Patent Number: 5,406,308
[45] Date of Patent: Apr. 11, 1995

[54] APPARATUS FOR DRIVING LIQUID CRYSTAL DISPLAY PANEL FOR DIFFERENT SIZE IMAGES

[75] Inventor: Tatsuya Shiki, Tokyo, Japan

[73] Assignee: NEC Corporation, Tokyo, Japan

[21] Appl. No.: 189,742

[22] Filed: Feb. 1, 1994

[30] Foreign Application Priority Data

Feb. 1, 1993 [JP] Japan .................................. 5-014379

[51] Int. Cl.6 .............................................. G09G 1/06
[52] U.S. Cl. ...................... 345/127; 345/99; 345/132; 345/202
[58] Field of Search ................. 345/127, 132, 202, 99; 395/102, 112; 359/54-57

[56] References Cited

U.S. PATENT DOCUMENTS

| | | | |
|---|---|---|---|
| 4,990,902 | 2/1991 | Zenda | 345/127 X |
| 5,031,118 | 7/1991 | Morizot | 345/132 |

FOREIGN PATENT DOCUMENTS

| | | |
|---|---|---|
| 0298390 | 1/1989 | European Pat. Off. . |
| 62-68588 | 11/1988 | Japan . |
| 2-294688 | 12/1990 | Japan . |
| 2302792 | 12/1990 | Japan .................................. 345/127 |
| 2237713 | 2/1989 | United Kingdom . |
| 2241416 | 8/1991 | United Kingdom ................. 345/127 |

OTHER PUBLICATIONS

Patent Abstracts of Japan, vol. 013, No. 496 (P-956) Nov. 9, 1989.
Patent Abstracts of Japan, vol. 015, No. 075 (P-1169) Feb. 21, 1991.
Patent Abstracts of Japan, vol. 015, No. 349 (P-1247) Sep. 4, 1991.
Patent Abstracts of Japan, vol. 015, No. 360 (P-1250) May 25, 1993.
Patent Abstracts of Japan, vol. 017, No. 267 (P-1543) Jun. 11, 1989.

Primary Examiner—Ulysses Weldon
Attorney, Agent, or Firm—Sughrue, Mion, Zinn, Macpeak & Seas

[57] ABSTRACT

In an apparatus for driving a liquid crystal display panel having signal lines and scan lines, the operation of a signal line driving circuit for sequentially driving the signal lines is started by a horizontal start timing signal which is obtained by delaying a horizontal synchronization signal with a first time period. Also, the operation of a scan line driving circuit for sequentially driving the scan lines is started by a vertical start timing signal which is obtained by delaying a vertical synchronization signal with a second time period. The first time period and the second time period are changed in accordance with a size of one frame of a video signal.

7 Claims, 22 Drawing Sheets

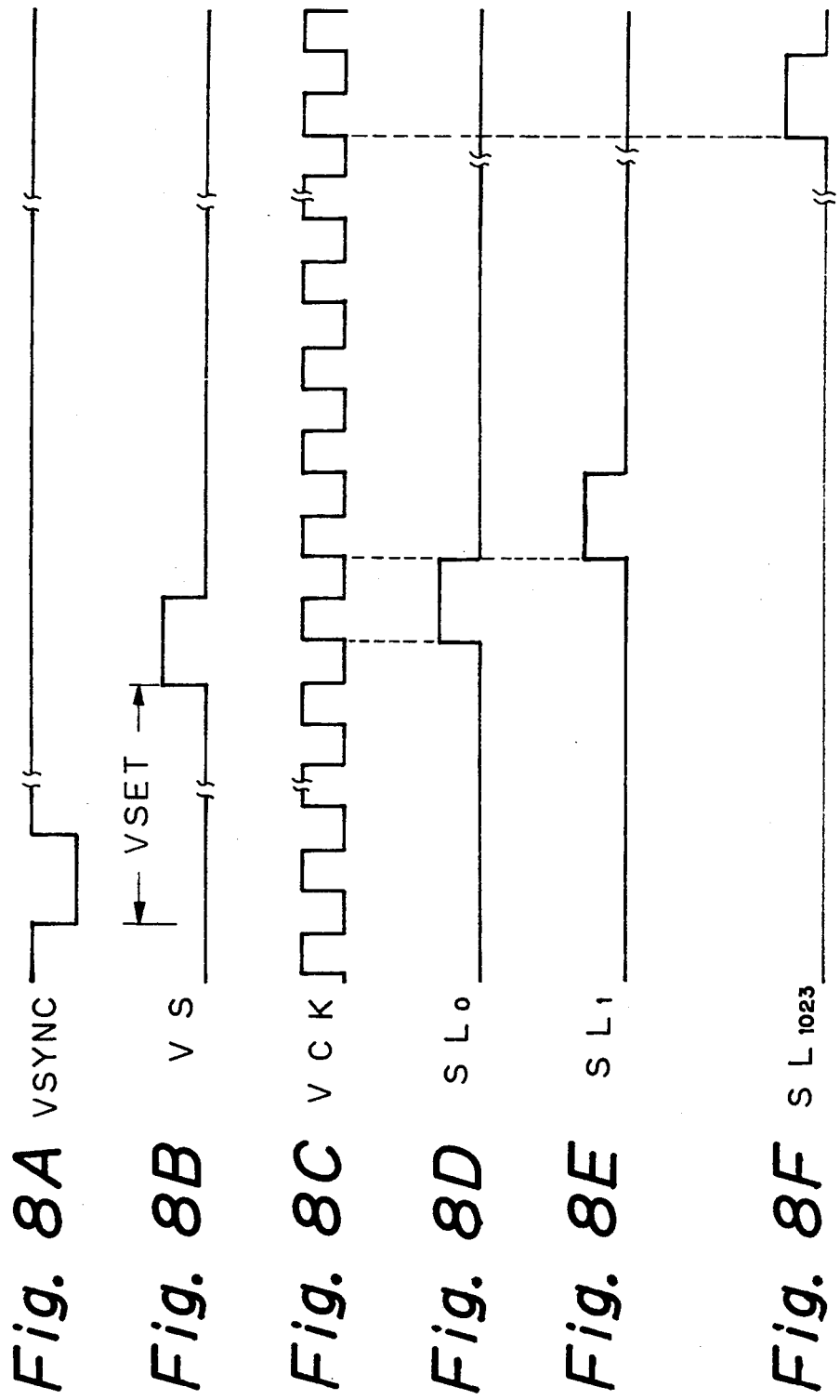

PRIOR ART
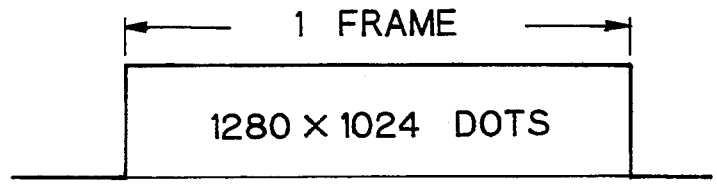
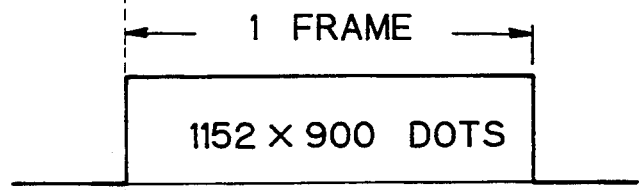
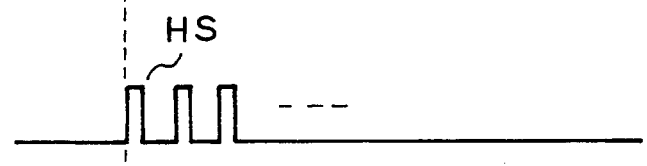
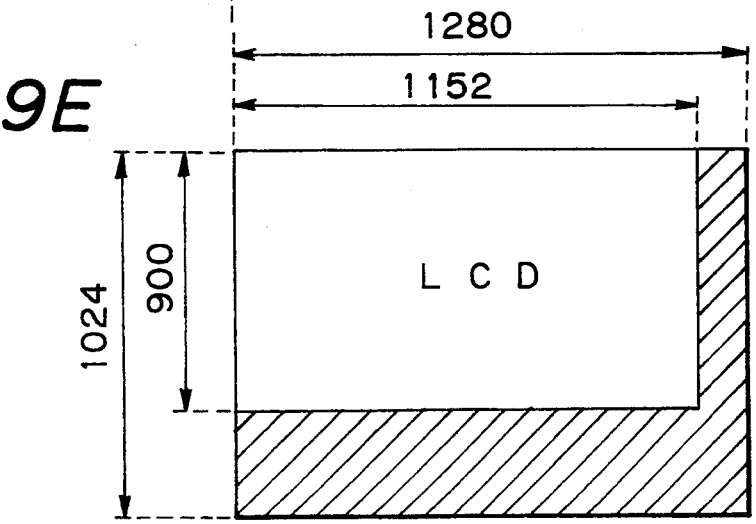

Fig. 13

| $f_H$ \ $f_v$ | $00_H$ | $01_H$ | --- | $FF_H$ |
|---|---|---|---|---|
| $00_H$ | HSET(00,00)<br>VSET(00,00) | HSET(00,01)<br>VSET(00,01) | ---- | HSET(00,FF)<br>VSET(00,FF) |
| $01_H$ | HSET(01,00)<br>VSET(01,00) | HSET(01,01)<br>VSET(01,01) | ---- | HSET(01,FF)<br>VSET(01,FF) |
| --- | ---- | ---- | ---- | ---- |
| $FF_H$ | HSET(FF,00)<br>VSET(FF,00) | HSET(FF,01)<br>VSET(FF,01) | ---- | HSET(FF,FF)<br>VSET(FF,FF) |

| fV \ fH | 00H | 01H | ---- | FFH |
|---|---|---|---|---|
| 00H | HSET(00,00)<br>VSET(00,00)<br>CONT(00,00) | HSET(00,01)<br>VSET(00,01)<br>CONT(00,01) | ---- | HSET(00,FF)<br>VSET(00,FF)<br>CONT(00,FF) |
| 01H | HSET(01,00)<br>VSET(01,00)<br>CONT(01,00) | HSET(01,01)<br>VSET(01,01)<br>CONT(01,01) | ---- | HSET(01,FF)<br>VSET(01,FF)<br>CONT(01,FF) |
| ---- | ---- | ---- | ---- | ---- |
| FFH | HSET(FF,00)<br>VSET(FF,00)<br>CONT(FF,00) | HSET(FF,01)<br>VSET(FF,01)<br>CONT(FF,01) | ---- | HSET(FF,FF)<br>VSET(FF,FF)<br>CONT(FF,FF) |

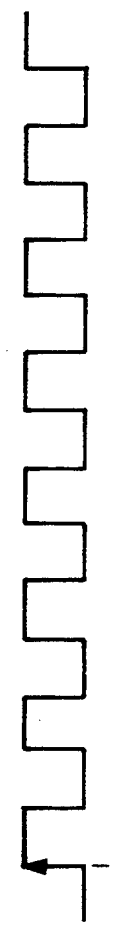
Fig. 20A DCK
Fig. 20B RA
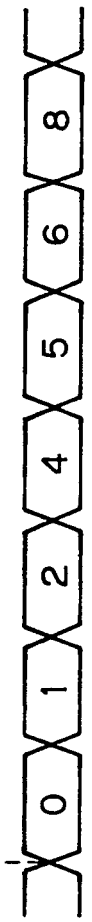
Fig. 20C RA'

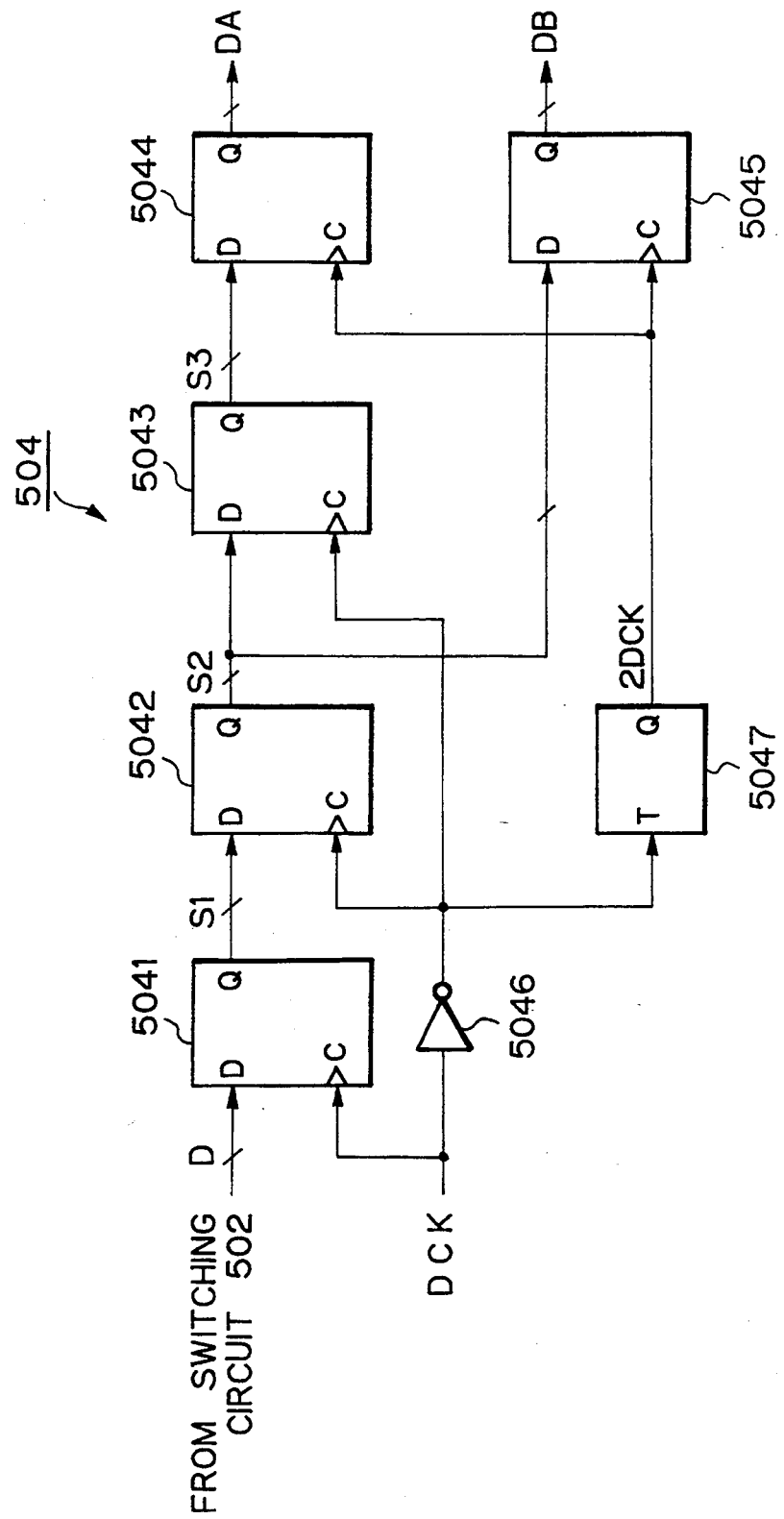

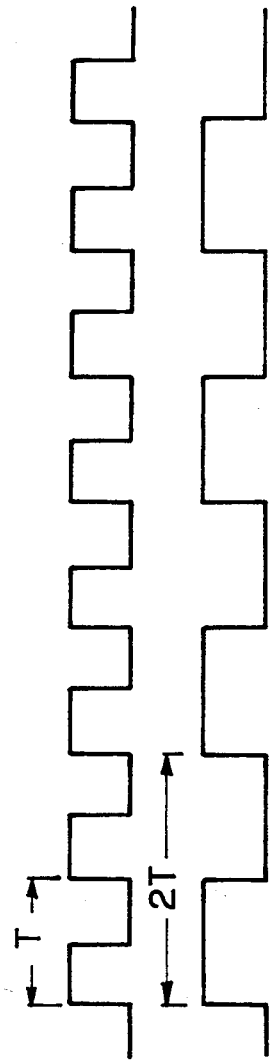
Fig. 22A DCK
Fig. 22B 2DCK
Fig. 22C D
Fig. 22D S1
Fig. 22E S2
Fig. 22F S3
Fig. 22G DA
Fig. 22H DB

APPARATUS FOR DRIVING LIQUID CRYSTAL DISPLAY PANEL FOR DIFFERENT SIZE IMAGES

BACKGROUND OF THE INVENTION

1. Field of the Invention

The present invention relates to a liquid crystal display (LCD) system, and more particularly, to an apparatus for driving a multi-synchronization type LCD panel for different size images.

2. Description of the Related Art

There has been known a multi-synchronization type deflecting apparatus for a cathode-ray tube (CRT) panel which can properly display images having different numbers of scan lines at a center portion of the panel. On the other hand, since LCD panels are thinner in size and lower in power consumption with a lower power supply voltage as compared with CRT panels, the LCD panels have recently been applied to personal computers, word processors, color telereceivers, and the like. However, the multi-synchronization type deflecting system of the CRT panels cannot be applied to the multi-synchronization type driving system of the LCD panels, due to the difference in driving (deflecting) methods therebetween.

In a prior art apparatus for driving an LCD panel having M signal lines, N scan lines and M×N liquid crystal cells connected to the signal lines and the scan lines, the operation of a signal line driving circuit for sequentially driving the signal lines is started by a horizontal start timing signal which is obtained by delaying a horizontal synchronization signal with a constant time period. Similarly, the operation of a scan line driving circuit for sequentially driving the scan lines is started by a vertical start timing signal which is obtained by delaying a vertical synchronization signal with a constant time period. As a result, an image having a size different from M×N dots is ill-balanced at an upper portion or a left portion of the LCD panel. This will be explained later in detail.

SUMMARY OF THE INVENTION

It is an object of the present invention to provide a multi-synchronization type driving apparatus for an LCD panel which can display an image having different size images at a center portion thereof.

According to the present invention, in an apparatus for driving a liquid crystal display panel having signal lines and scan lines, the operation of a signal line driving circuit for sequentially driving the signal lines is started by a horizontal start timing signal which is obtained by delaying a horizontal synchronization signal with a first time period. Also, the operation of a scan line driving circuit for sequentially driving the scan lines is started by a vertical start timing signal which is obtained by delaying a vertical synchronization signal with a second time period. The first time period and the second time period are changed in accordance with the size of one frame of a video signal. Thus, different size images can be displayed at a center portion of the LCD panel.

BRIEF DESCRIPTION OF THE DRAWINGS

The present invention will be more clearly understood from the description as set forth below, in comparison with the prior art, with reference to the accompanying drawings, wherein:

FIGS. 8A through 8F are timing diagrams showing the operation of the circuits of FIGS. 6 and 7;

FIGS. 9A through 9D are timing diagrams for explaining a video signal of one frame in the prior art;

FIG. 9E is a diagram showing an image displayed on the LCD panel of FIG. 1;

FIG. 13 is a diagram showing the content of the look-up table of FIG. 12;

FIGS. 14A through 14D are timing diagrams for explaining a video signal of one frame according to the present invention;

FIG. 17 is a diagram showing the content of the look-up table of FIG. 15;

FIGS. 20A, 20B and 20C are timing diagrams showing the operation of the circuit of FIG. 19;

FIG. 21 is a circuit diagram of the layer expansion circuit of FIG. 18; and

FIGS. 22A through 22H are timing diagrams showing the operation of the circuit of FIG. 21.

DESCRIPTION OF THE PREFERRED EMBODIMENTS

Before the description of the preferred embodiments, a prior art apparatus for driving an LCD panel will be explained with reference to FIGS. 1, 2, 3, 4A through 4F, 5A, 5B, 6, 7, 8A through 8F, and 9A through 9E.

Figure 1:
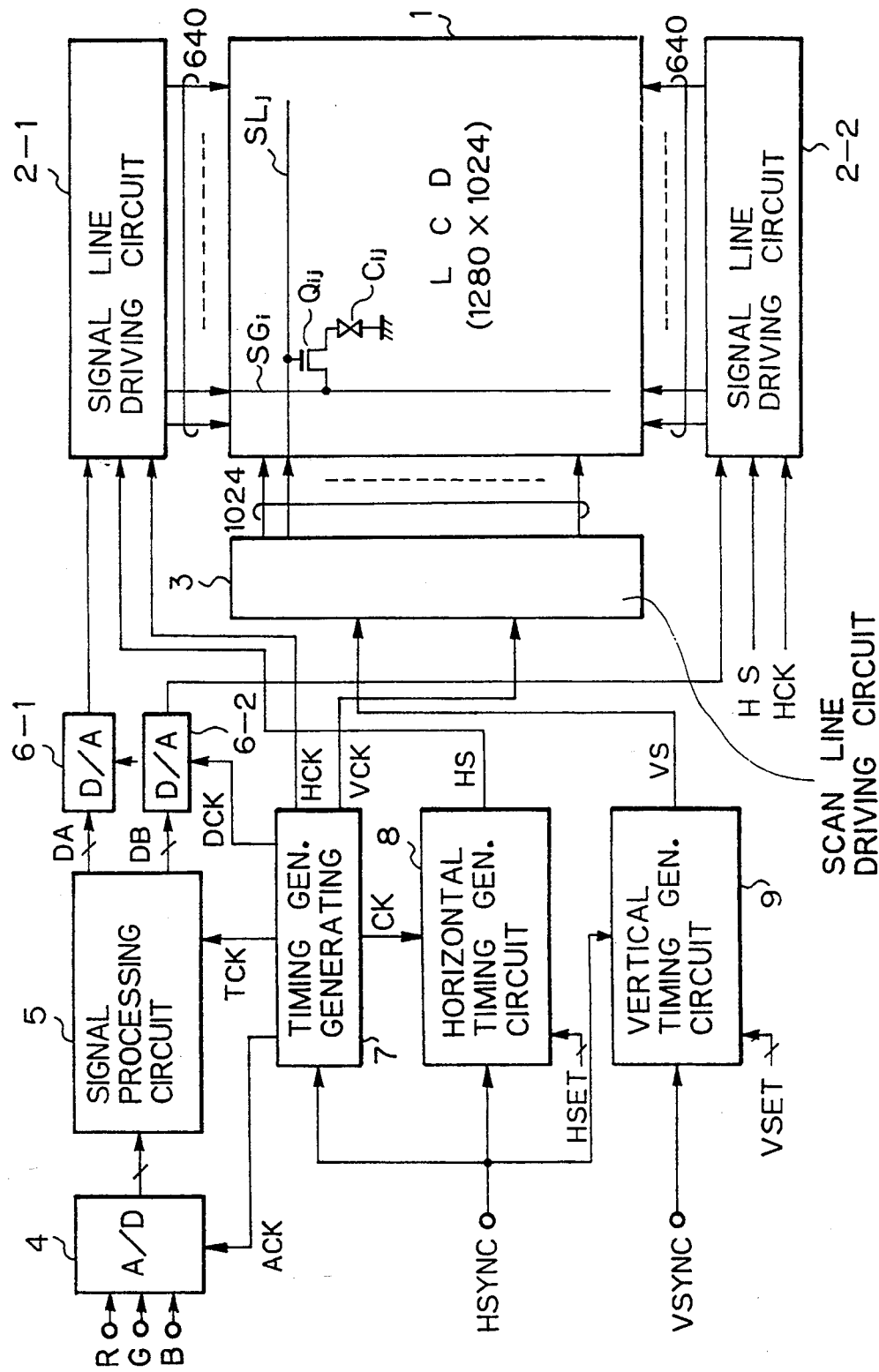
FIG. 1 is a block circuit diagram illustrating a prior art apparatus for driving an LCD panel.

In FIG. 1, which illustrates a prior art apparatus for driving an LCD panel, reference numeral 1 designates an LCD panel having M×N dots where M=1280 and N=1024. That is, the LCD panel 1 has signal lines SG$_i$ (i=0, 1, ..., 1279) driven by signal line driving circuits 2-1 and 2-2, 1024 scan lines SL$_j$ (j=0, 1, ..., 1023) driven by a scan line driving circuit 3, and pixels each connected to one of the scan lines and one of the signal lines. Also, each of the pixels is formed by a thin film transistor (TFT) Q$_{ij}$ and a liquid crystal cell C$_{ij}$.

An analog/digital (A/D) converter 4 receives color signals R, G and B of a video signal and performs an A/D conversion thereupon by using a clock signal ACK. The digital output of the A/D converter 4 is supplied to a signal processing circuit 5 clocked by a clock signal TCK. The signal processing circuit 5 includes a layer expansion circuit which will be later explained. Two outputs DA and DB of the signal processing circuit 5 are supplied to two D/A converters 6-1 and 6-2, respectively, clocked by a clock signal DCK, and the converters are also connected to the signal line driving circuits 2-1 and 2-2, respectively.

A timing generating circuit 7, which includes a phase-locked loop (PLL) circuit, receives a horizontal synchronization signal HSYNC to thereby generate various clock signals HCK, VCK, CK in addition to the clock signals ACK, TCK and DCK. In this case, the clock signal HCK is used for sequentially driving the signal line driving circuits 2-1 and 2-2, and the clock signal VCK is used for sequentially driving the scan line driving circuit 3.

A horizontal timing generating circuit 8 generates a horizontal start timing signal HS and transmits it to the signal line driving circuits 2-1 and 2-2, to thereby start the operation thereof. Also, a vertical timing generating circuit 9 generates a vertical start timing signal VS and transmits it to the scan line driving circuit 3, to thereby start the operation thereof.

Figure 2:
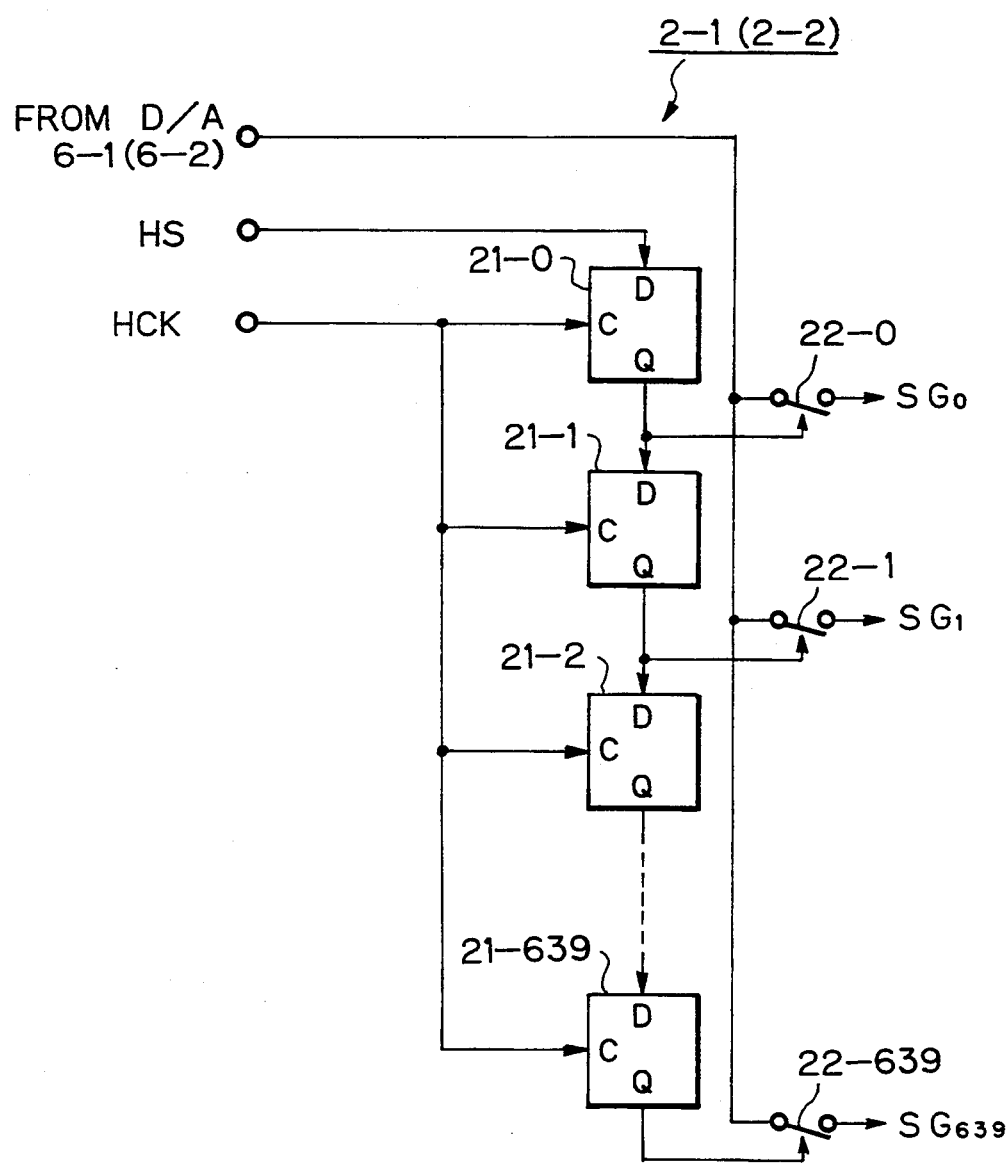
FIG. 2 is a detailed block circuit diagram of the signal line driving circuit of FIG. 1.

In FIG. 2, which is a detailed block circuit diagram of the signal line driving circuit 2-1 (2-2) of FIG. 1, shift registers (D flip-flops) 21-0, 21-1, . . . , 21-639 are serially-connected. The horizontal start timing signal HS is shifted through the shift registers 21-0, 21-1, . . . , 21-639 by the clock signal HCK. The outputs of the shift registers 21-0, 21-1, . . . , 21-639 control switching circuits 22-0, 22-1, . . . , 22-639, respectively, which receive the data signal of the D/A converter 6-1 (6-2). Thus, the switching circuits 22-0, 22-1, . . . , 22-639 sequentially drive the signal lines $SG_0$, $SG_1$, . . . , $SG_{639}$, respectively, in accordance with the video signal.

Figure 3:
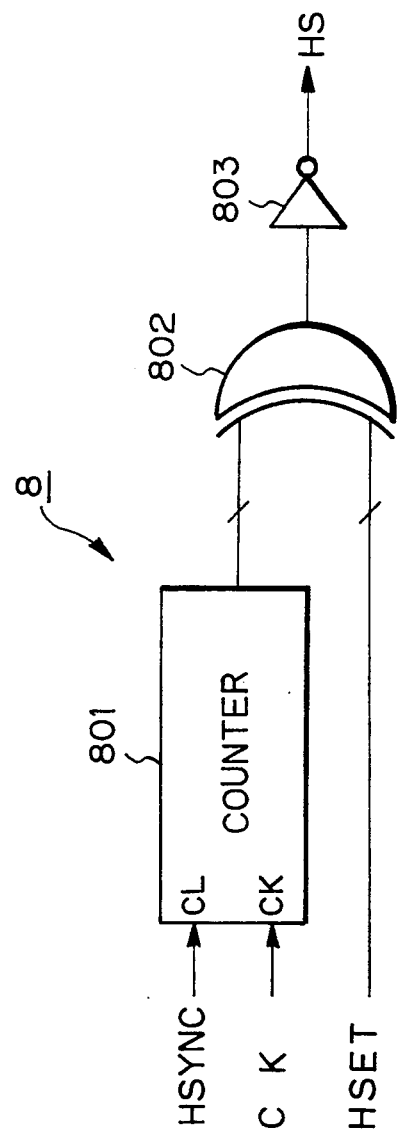
FIG. 3 is a detailed circuit diagram of the horizontal timing generating circuit of FIG. 1.

In FIG. 3, which is a detailed circuit diagram of the horizontal start timing circuit 8 of FIG. 1, this circuit 8 includes a counter 801 which counts the clock signal CK and is cleared by the horizontal synchronization signal HSYNC. Also, an exclusive OR circuit 802 and an inverter 803 compare the content of the counter 801 with a constant value HSET. That is, only when the content of the counter 801 coincides with the constant value HSET, is the output of the inverter 803, i.e., the horizontal start timing signal HS, "1".

Figure 4:
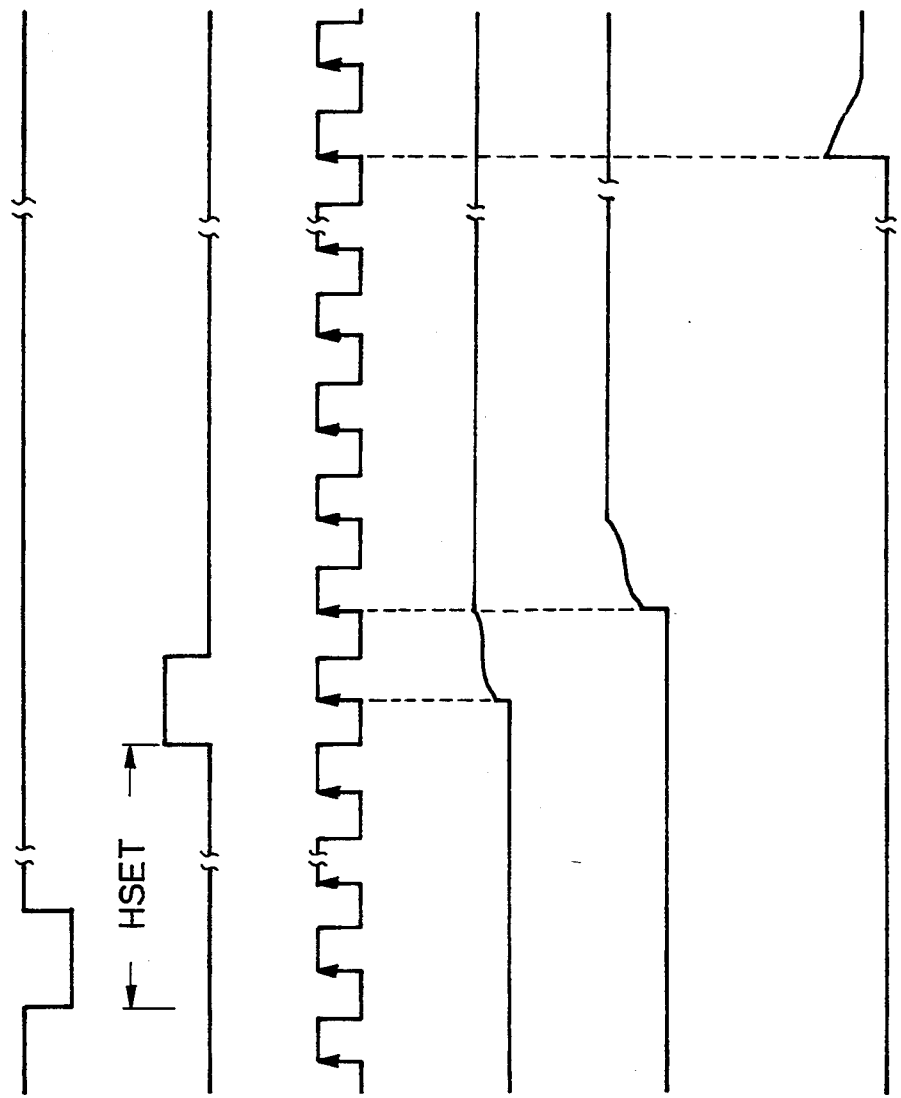
FIGS. 4A through 4F are timing diagrams showing the operation of the circuits of FIGS. 2 and 3.

The operation of the horizontal start timing circuit 8 and the signal line driving circuit 2-1 (2-2) will be explained with reference to FIGS. 4A through 4F. That is, the horizontal start timing generating circuit 8 counts the clock signal CK after the horizontal synchronization signal HSYNC is made "0" (low) as shown in FIG. 4A. As a result, after the constant time period HSET has passed, the horizontal timing generating circuit 8 generates the horizontal start timing signal HS as shown in FIG. 4B. Therefore, the horizontal start timing signal HS is supplied to the first stage of the shift registers, i.e., the shift register 21-0, and the horizontal start timing signal HS is shifted through the shift registers 21-0, 21-1, . . . , 21-639 by the clock signal HCK as shown in FIG. 4C. As a result, the signal lines $SG_0$, $SG_1$, . . . , $SG_{639}$ are sequentially driven by the AND logic between the output signals of the shift registers 21-0, 21-1, . . . , 2-1639 and the data of the video signal as shown in FIGS. 4D, 4E and 4F.

Figure 5:
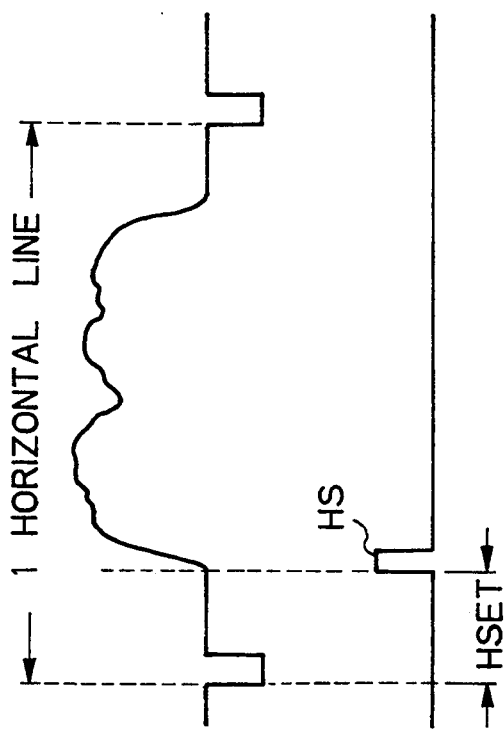
FIGS. 5A and 5B are timing diagrams for explaining an image signal of one horizontal line.

Thus, in the prior art, the relationship between a horizontal line of the video signal as shown in FIG. 5A and the horizontal start timing signal HS as shown in FIG. 5B is constant.

Figure 6:
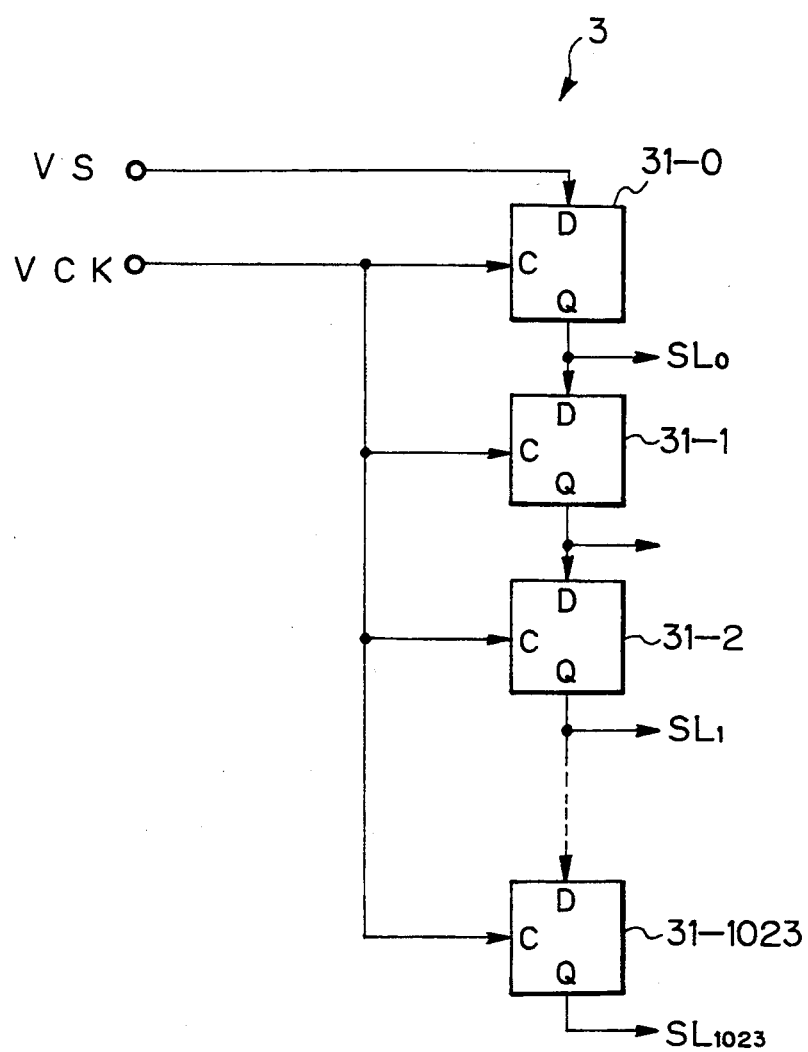
FIG. 6 is a detailed block circuit diagram of the scan line driving circuit of FIG. 1.

In FIG. 6, which is a detailed block circuit diagram of the scan line driving circuit 3 of FIG. 1, shift registers (D flip-flops) 31-0, 31-1, . . . , 31-1023 are serially-connected for driving the scan lines $SL_0$, $SL_1$, . . . , $SL_{1023}$, respectively. The vertical start timing signal VS is shifted through the shift registers 31-0, 31-1, . . . , 31-1023 by the clock signal VCK.

Figure 7:
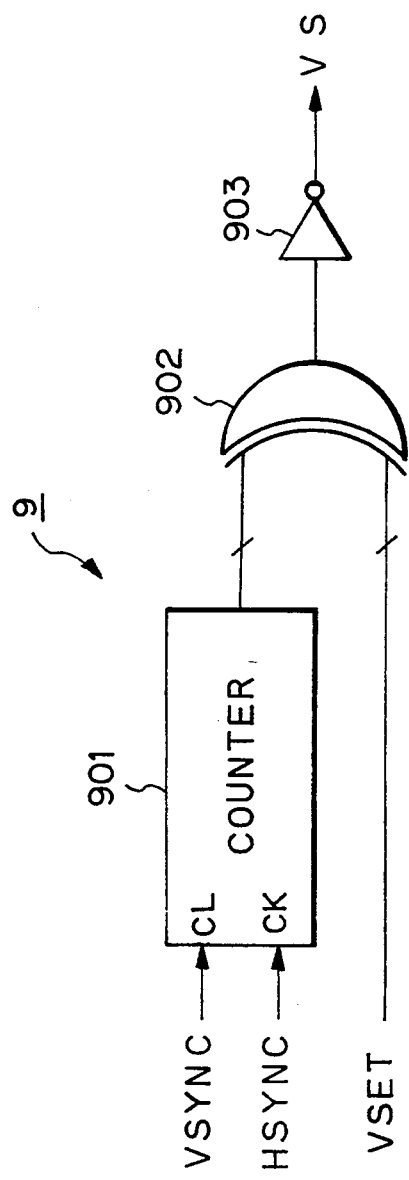
FIG. 7 is a detailed circuit diagram of the vertical timing generating circuit of FIG. 1.

In FIG. 7, which is a detailed circuit diagram of the vertical start timing circuit 9 of FIG. 1, this circuit 9 includes a counter 901 which counts the horizontal synchronization signal HSYNC and is cleared by a vertical synchronization signal VSYNC. Also, an exclusive OR circuit 902 and an inverter 903 compare the content of the counter 901 with a constant value VSET. That is, only when the content of the counter 901 coincides with the constant value VSET, is the output of the inventer 903, i.e., the vertical start timing signal VS, "1".

The operation of the vertical start timing circuit 9 and the scan line driving circuit 3 will be explained with reference to FIGS. 8A through 8F. The vertical start timing generating circuit 9 counts the horizontal start signal HS after the vertical synchronization signal VSYNC is made "0" (low) as shown in FIG. 8A. As a result, after the constant time period VSET has passed, the vertical timing generating circuit 9 generates the vertical start timing signal VS as shown in FIG. 8B. Therefore, the vertical start timing signal VS is supplied to the first stage of the shift registers, i.e., the shift register 31-0, and the vertical start timing signal VS is shifted through the shift registers 31-0, 31-1, . . . , . . . , 31-1023 by the clock signal VCK as shown in FIG. 8C. As a result, the scan lines $SL_0$, $SL_1$, . . . , $SL_{1023}$ are sequentially driven by the output signals of the shift registers 31-0, 31-1, . . . , 31-1023 as shown in FIGS. 8D, 8E and 8F.

Thus, in the prior art, even if an image having 1152×900 dots as shown in FIG. 9B, that is smaller than an image having 1280×1024 dots as shown in FIG. 9A, is displayed On the LCD panel 1 having 1280×1024 dots, the timing of the horizontal start timing signal HS is constant as shown in FIG. 9C, and the timing of the vertical start timing signal VS is constant as shown in FIG. 9D. As a result, as shown in FIG. 9E, a 1152×900 dot image is ill-balanced at an upper-left portion of the LCD panel 1.

Figure 10:
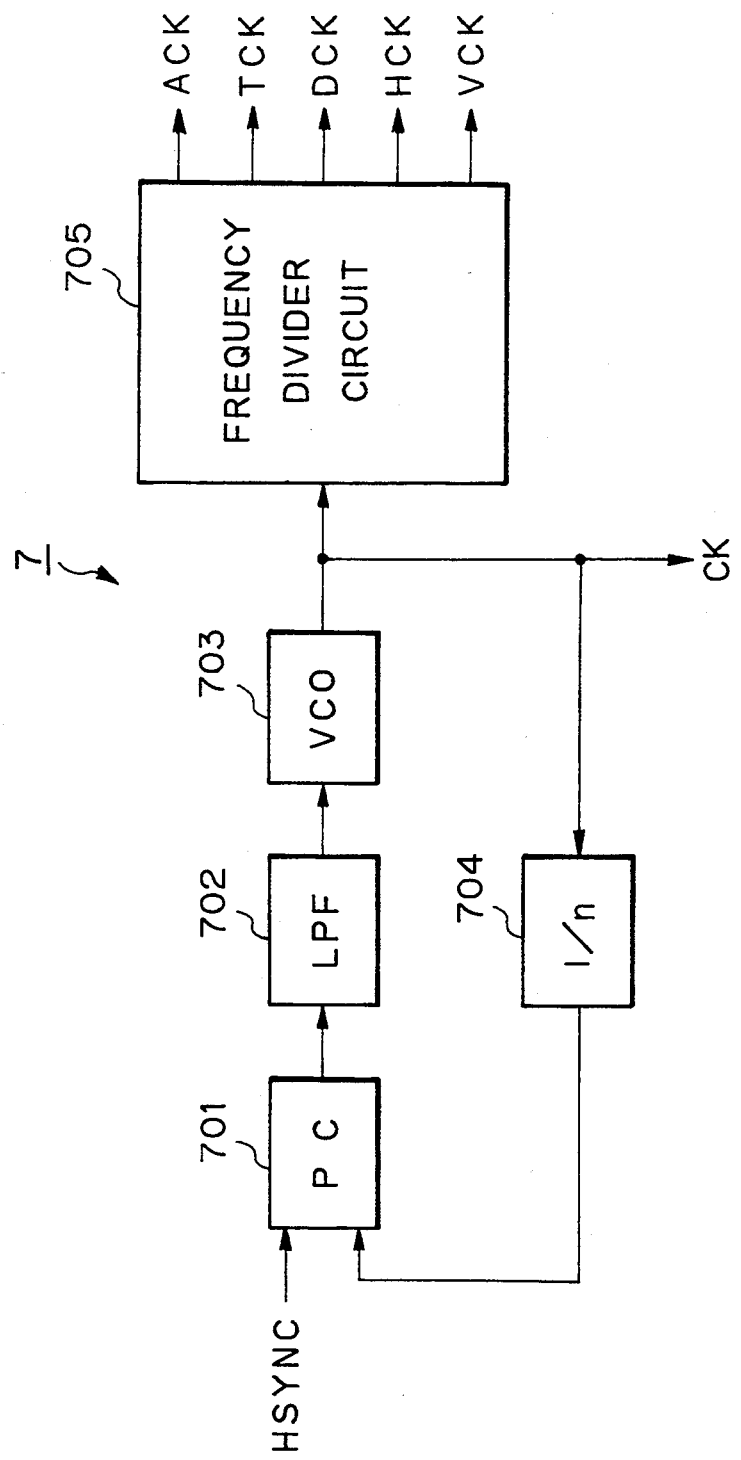
FIG. 10 is a detailed circuit diagram of the timing generating circuit of FIG. 1.

In FIG. 10, which is a detailed circuit diagram of the timing generating circuit 7 of FIG. 1, this circuit 7 includes a PLL circuit formed by a phase comparator 701, a low-pass filter 702, a voltage controlled oscillator 703, and a 1/n frequency divider 704. That is, the phase comparator 701 compares the phase of the horizontal synchronization signal HS with that of the output signal of the 1/n frequency divider 704. The low-pass filter 702 includes a capacitor which is charged or discharged by the output of the phase comparator 701. The voltage controlled oscillator 703 generates the clock signal CK whose frequency corresponds to the output of the low-pass filter 702. Thus, the frequency of the clock signal CK is maintained at a definite value determined by the horizontal synchronization signal HSYNC. Note the value n of the frequency divider 704 corresponds to the sampling number of the clock signal CK for one horizontal line of the video signal.

The timing generating circuit 7 also includes a frequency divider circuit formed by a plurality of frequency dividers which generate the clock signals ACK, TCK, DCK, HCK and VCK.

Figure 11:
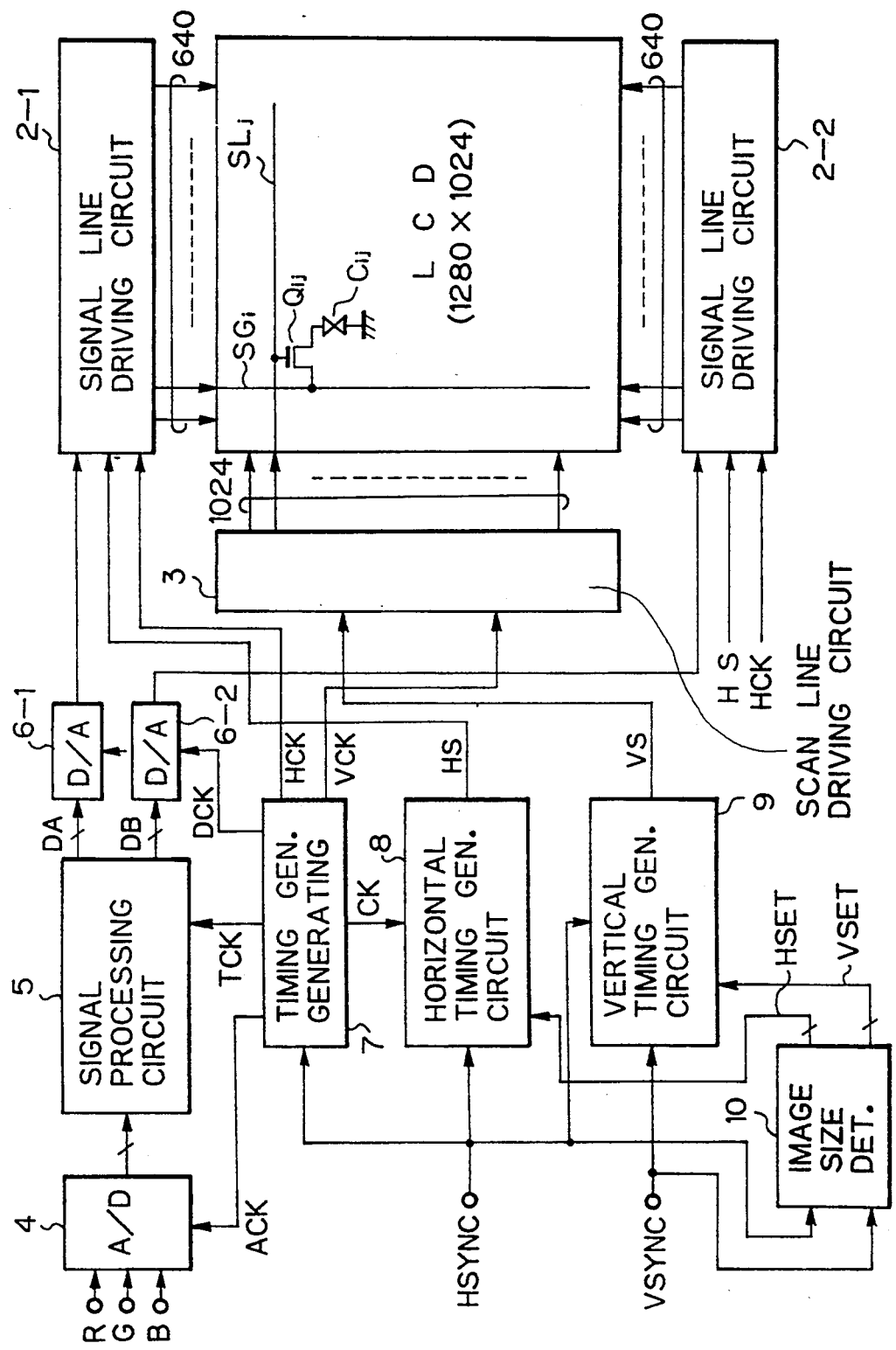
FIG. 11 is a block circuit diagram illustrating a first embodiment of the apparatus for driving an LCD panel according to the present invention.

In FIG. 11, which illustrates a first embodiment of the present invention, the value HSET of the horizontal timing circuit 8 and the value VSET of the vertical timing circuit 9 are variable, and the values HSET and VSET are changed by an image size determining circuit 10 which calculates an image size of one frame of the video signal in accordance with the horizontal synchronization signal HSYNC and the vertical synchronization signal VSYNC. The image size determining circuit 10 is formed by a circuit as illustrated in FIG. 12.

Figure 12:
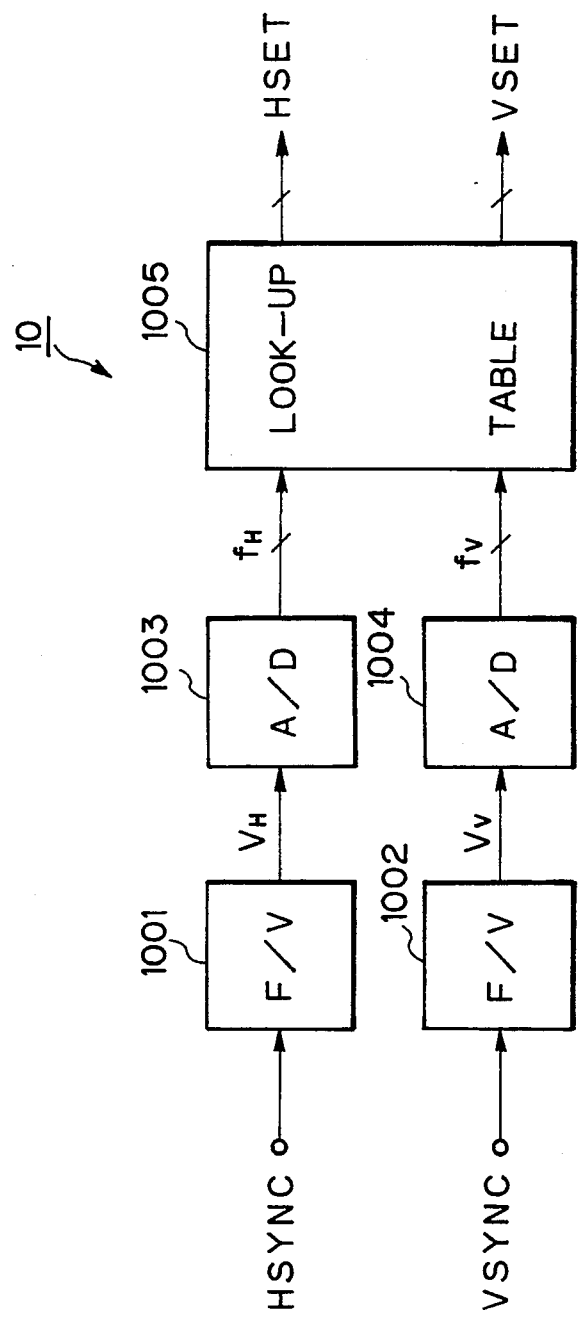
FIG. 12 is a detailed block circuit diagram of the image size determining circuit of FIG. 11.

In FIG. 12, reference numeral 1001 designates a frequency-to-voltage converter for receiving the horizontal synchronization signal HSYNC to generate a voltage $V_H$ in response to the frequency of the horizontal synchronization signal HSYNC. Also, reference numeral 1002 designates a frequency-to-voltage converter for receiving the vertical synchronization signal VSYNC to generate a voltage $V_V$ in response to the frequency of the vertical synchronization signal VSYNC. The voltages $V_H$ and $V_V$ are converted by analog-to-digital converters 1003 and 1004 into digital values $f_H$ and $f_V$, respectively. Then, the digital values $f_H$ and $f_V$ are supplied to a look-up table 1005, which in turn generates the values HSET and VSET. The look-up table 1005 is formed by a random access memory (RAM) or a read-only memory (ROM) for storing the values HSET and VSET as shown in FIG. 13.

Figure 14A:
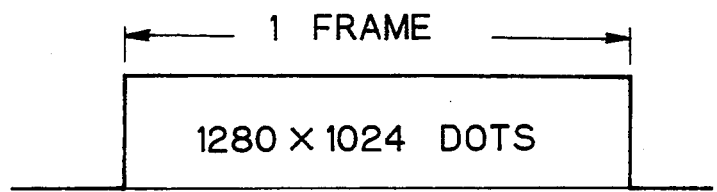
Figure 14B:
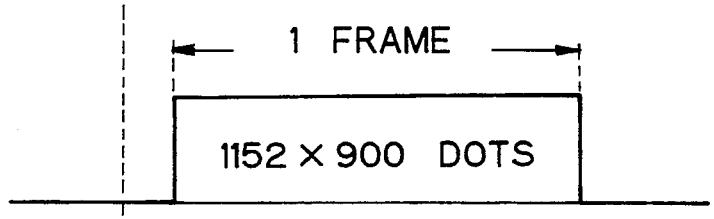
Figure 14D:
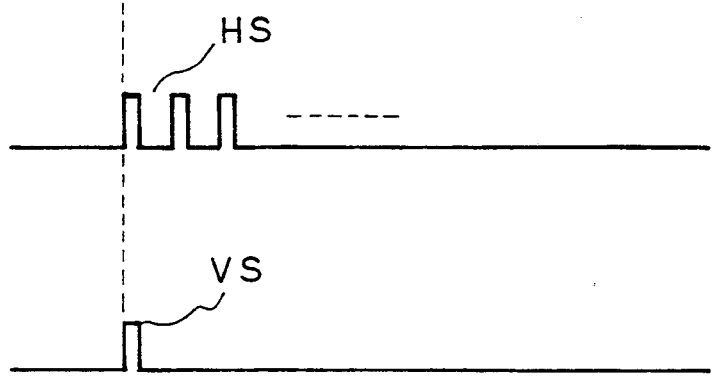
Figure 14E:
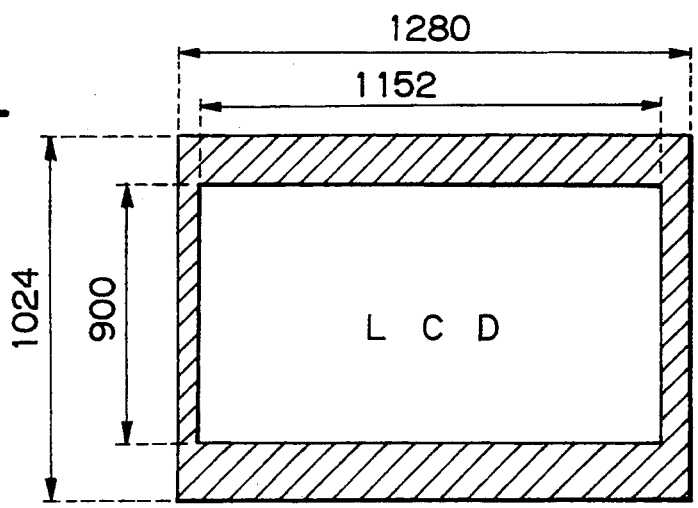
FIG. 14E is a diagram showing an image displayed on the LCD panel of FIG. 11.

Thus, according to the first embodiment, even if an image having 1152×900 dots as shown in FIG. 14B, that is smaller than an image having 1280×1024 dots as shown in FIG. 14A, is displayed on the LCD panel 1 having 1280×1024 dots, the timing of the horizontal start timing signal HS is variable as shown in FIG. 14C, and the timing of the vertical start timing signal VS is variable as shown in FIG. 14D. As a result, as shown in FIG. 14E, a 1152×900 dot image is balanced at a center portion of the LCD panel 1.

Figure 15:
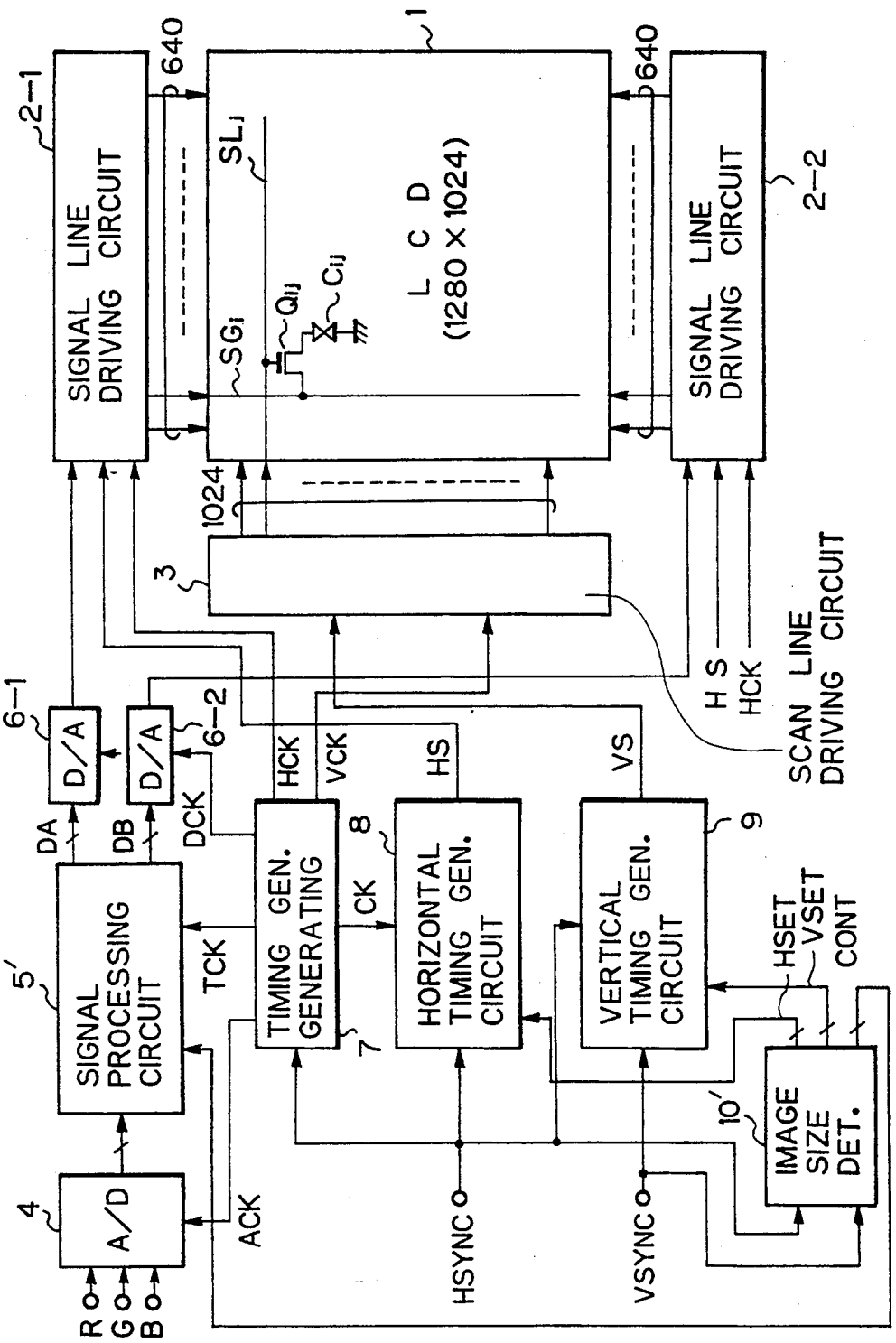
FIG. 15 is a block circuit diagram illustrating a second embodiment of the apparatus for driving an LCD panel according to the present invention.

In FIG. 15, which illustrates a second embodiment of the present invention, the image size determining circuit 10 of FIG. 11 is modified to from an image size determining circuit 10' which generates a compression control signal CONT in addition to the signals HSET and VSET. Also, the signal processing circuit 5 of FIG. 11 is modified to from a signal processing circuit 5' which can perform data compression upon the video signal. That is, when a video signal of an image larger than an image having 1280×1024 dots is supplied to the signal processing circuit 5', data compression is performed upon the video signal in accordance with the compression control signal CONT including compression ratio information.

Figure 16:
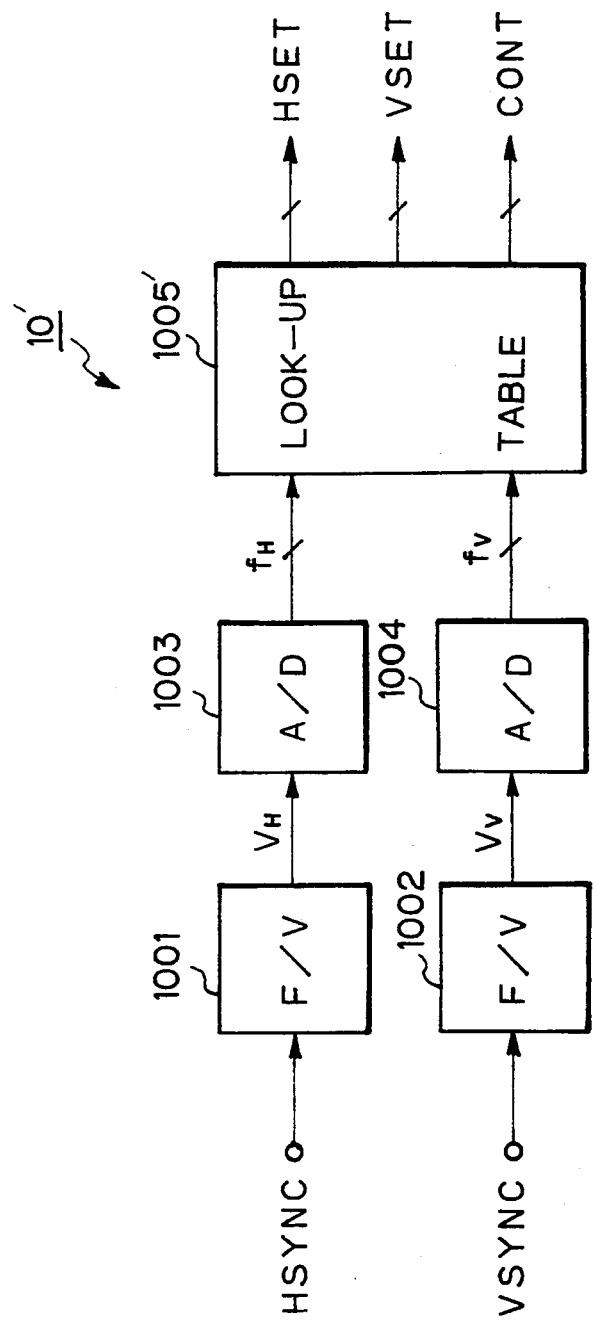
FIG. 16 is a detailed circuit diagram of the image size determining circuit of FIG. 15.

In FIG. 16, which is a detailed circuit diagram of the image size determining circuit 10' of FIG. 15, the look-up memory 1005 of FIG. 12 is modified to from a look-up memory 1005' which generates the compression control signal COUT in addition to the signals HSET and VSET. The look-up memory 1005' is formed by a RAM or ROM for storing the values HSET, VSET and CONT as shown in FIG. 17.

Figure 18:
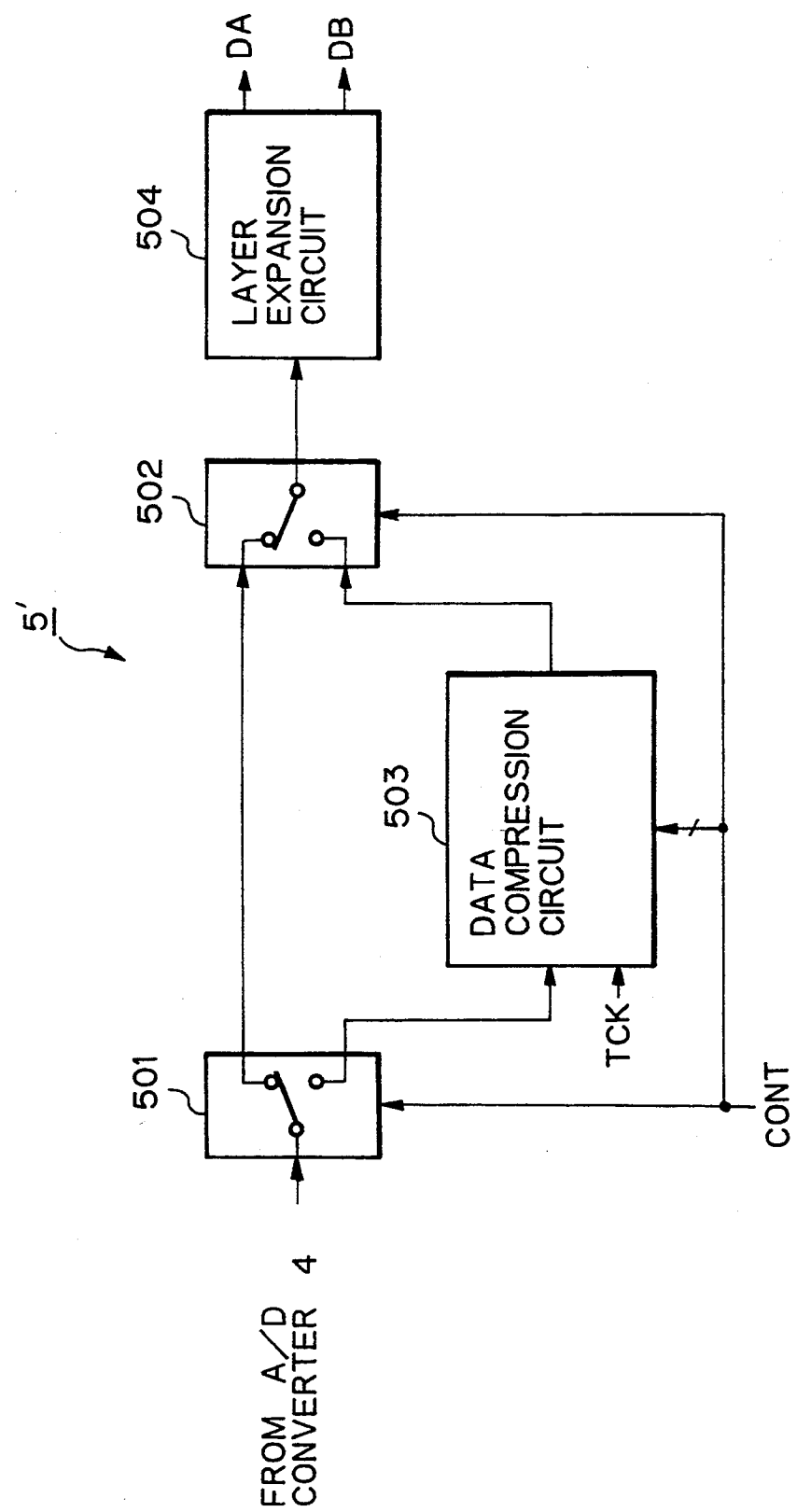
FIG. 18 is a detailed circuit diagram of the signal processing circuit of FIG. 15.

In FIG. 18, which is a detailed circuit diagram of the data processing circuit 5' of FIG. 15, this circuit 5' includes switching circuits 501 and 502, a data compression circuit 503, and a layer expansion circuit 504 which is used for distributing the video signal to the two signal line driving circuits 2-1 and 2-2. For example, if a first bit of the compression control signal CONT is "0", the switching circuits 501 and 502 are positioned on their upper sides as illustrated, so that data from the A/D converter 4 is supplied via the switching circuits 501 and 502 directly to the layer expansion circuit 504. Conversely, if the first bit of the compression control signal CONT is "1", the switching circuits 501 and 502 are positioned on their lower sides, so that data from the A/D converter 4 is supplied via the switching circuit 501 to the data compression circuit 503. Therefore, in the data compression circuit 503, data compression is performed upon the video signal using the compression ratio included in the compression control signal CONT in synchronization with the clock signal TCK. Then, the data compressed by the data compression circuit 503 is supplied via the switching circuit 502 to the layer expansion circuit 504.

Figure 19:
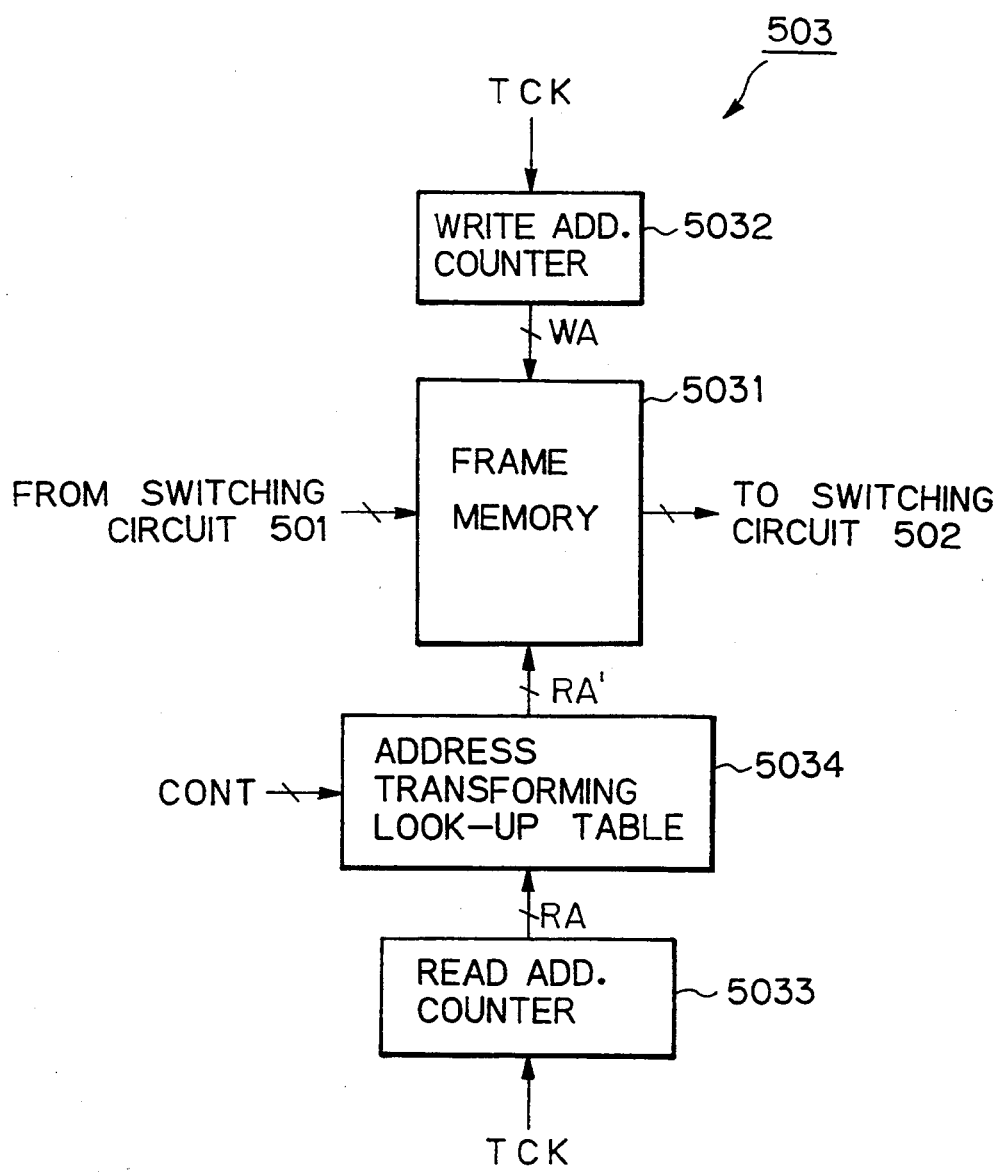
FIG. 19 is a circuit diagram of the data compression circuit of FIG. 18.

In FIG. 19, which is a detailed circuit diagram of the data compression circuit 503 of FIG. 18, this circuit 503 includes a frame memory 5031 for writing data from the switching circuit 501 and outputting data to the switching circuit 502. A write operation is carried out upon the frame memory 5031 by a write address counter 5032 whose write address WA is sequentially counted up by receiving the clock signal TCK. On the other hand, a read operation is carried out upon the frame memory 5031 by a read address counter 5033 and an address transforming look-up table 5034. In this case, a read address RA generated by the read address counter 5033 is sequentially counted up in synchronization with the clock signal TCK as shown in FIGS. 20A and 20B. However, as shown in FIG. 20C, a read address RA' generated from the address transforming look-up table 5034 is shifted as compared with the read address RA in accordance with the compression ratio information included in the compression control signal CONT. Note that the compression ratio information is composed of a traverse ratio and/or a longitudinal ratio.

Thus, even when a video signal of an image having more dots than 1280 in the traverse direction or more dots than 1024 in the longitudinal direction is input, the entire of the video signal is so compressed that it can be displayed on the LCD panel 1.

In FIG. 21, which is a detailed circuit diagram of the layer expansion circuit 504 of FIG. 18, this circuit 504 includes D flip-flops 5041, 5042, 5043, 5044, and 5045, an inverter 5046, and a T flip-flop 5047. That is, the D flip-flops 5041, 5042 and 5043 are clocked by the clock signal DCK or its inverted signal having a period T as shown in FIG. 22A, while the D flip-flops 5044 and 5045 are clocked by a clock signal 2DCK having a period 2T as shown in FIG. 22B. Therefore, the outputs S1, S2 and S3 of the flip-flops 5041, 5042 and 5043 are obtained by delaying the output D of the switching circuit 502, as shown in FIGS. 22C, 22D, 22E and 22F. On the other hand, since the flip-flops 5044 and 5045 are clocked by the clock signal 2DCK, the outputs DA and DB of the flip-flops 5044 and 5045 have the period 2T, so that the outputs DA and DB of the flip-flops 5044 and 5045 are as shown in FIGS. 22G and 22H.

In the above-mentioned embodiments, although the horizontal synchronization signal HSYNC and the vertical synchronization signal VSYNC are supplied independently of the color signals R, G and B, if the horizontal synchronization signal HSYNC and the vertical synchronization signal VSYNC are included in the color signal G, these synchronization signals can be derived from the color signal G.

As explained hereinbefore, according to the present invention, even an image having a different size than an LCD panel can be displayed at a center portion of the LCD panel.

I claim:

1. An apparatus for driving a liquid crystal display panel having M signal lines, N scan lines, and M×N liquid crystal cells each connected to one of said signal lines and one of said scan lines, comprising:

means for sequentially driving said signal lines;
means for sequentially driving said scan lines;
means for calculating a size of one frame of a video signal including: (a) means for calculating a horizontal frequency in accordance with a horizontal synchronization signal, (b) means for calculating a vertical frequency in accordance with a vertical synchronization signal, and (c) means, connected to said horizontal frequency calculating means and said vertical frequency calculating means, for generating the horizontal start timing signal and the vertical start timing signal in accordance with the horizontal frequency and the vertical frequency;
wherein said horizontal frequency calculating means includes: (a) a frequency-to-voltage converter for receiving the horizontal synchronization signal and (b) an analog-to-digital converter connected to said frequency-to-voltage converter; and
wherein said vertical frequency calculating means includes: (a) a frequency-to-voltage converter for receiving the vertical synchronization signal and (2) an analog-to-digital converter connected to said frequency-to-voltage converter;
means, connected to said size calculating means and said signal line driving means, for generating a horizontal start timing signal in accordance with the size of one frame of the video signal and transmitting it to said signal line driving means, to thereby start an operation thereof; and
means, connected to said size calculating means and scan line driving means, for generating a vertical start timing signal in accordance with the size of one frame of the video signal and transmitting it to said scan line driving means, to thereby start an operation thereof;
wherein said horizontal start timing signal/vertical start timing signal generating means comprises a look-up table; and
wherein outputs of the analog-to-digital converters are connected directly to the look-up table.

2. An apparatus as set forth in claim 1, further comprising:

a data compression circuit for receiving the video signal;
switching means, connected to said size calculating means and said data compression circuit, for supplying the video signal to said data compression circuit in accordance with the size of one frame of the video signal.

3. An apparatus for driving a liquid crystal display panel having M signal lines, N scan lines, and M×N liquid crystal cells each connected to one of said signal lines and one of said scan lines, comprising:

a signal line driving circuit, connected to said signal lines, for sequentially driving said signal lines in response to a horizontal start timing signal;
a scan line driving circuit, connected to said scan lines, for sequentially driving said scan lines in response to a vertical start timing signal;
a horizontal timing generating circuit, connected to said signal line driving circuit, for receiving a horizontal synchronization signal and delaying it with a first time period, to generate the horizontal start timing signal and transmit it to said signal line driving circuit;
a vertical timing generating circuit, connected to said scan line driving circuit, for receiving a vertical synchronization signal and delaying it with a second time period, to generate the vertical start timing signal and transmit it to said scan line driving circuit; and
an image size determining circuit, connected to said horizontal timing circuit and said vertical timing circuit, for receiving the horizontal synchronization signal and the vertical synchronization signal, to calculate the first time period and the second time period and transmit them to said horizontal timing generating circuit and said vertical timing generating circuit, respectively;
wherein said image size determining circuit includes: (a) means for calculating a horizontal frequency in accordance with a horizontal synchronization signal, (b) means for calculating a vertical frequency in accordance with a vertical synchronization signal, and (c) means, connected to said horizontal frequency calculating means and said vertical frequency calculating means, for generating the horizontal start timing signal and the vertical start timing signal in accordance with the horizontal frequency and the vertical frequency;
wherein said horizontal frequency calculating means includes: (a) a frequency-to-voltage converter for receiving the horizontal synchronization signal and (b) an analog-to-digital converter, connected to said frequency-to-voltage converter;
wherein said vertical frequency calculating means includes: (a) a frequency-to-voltage converter for receiving the vertical synchronization signal and (b) an analog-to-digital converter connected to said frequency-to-voltage converter;
wherein said horizontal start timing signal/vertical start timing signal generating means comprises a look-up table; and
wherein outputs of the analog-to digital converters are connected directly to the look-up table.

4. An apparatus as set forth in claim 3, wherein said image size determining circuit generates a compression control signal including a compression ratio in accordance with the horizontal synchronization signal and the vertical synchronization signal, said apparatus further comprising:

a data compression circuit for receiving a video signal;
switching means, connected to said image size determining circuit and said data compression circuit, for supplying the video signal to said data compression circuit in accordance with the compression control signal.

5. An apparatus as set forth in claim 4, wherein said data compression circuit comprises:

a frame memory for storing the video signal;
a write address counter, connected to said frame memory, for generating a sequential write address and transmitting it to said frame memory, to thereby perform a write operation thereupon;
a read address counter for generating a sequential read address;
an address transforming circuit, connected to said read address counter, said frame memory, and said image size determining circuit, for transforming the sequential read address into a read address in accordance with the compression ratio included in the compression control signal and transmitting the read address to said frame memory, to thereby perform a read operation thereupon.

6. An apparatus as set forth in claim 3, wherein said horizontal timing generating circuit comprises:
a counter for counting a clock signal, said counter being cleared by the horizontal synchronization signal; and
a coincidence circuit, connected to said counter and said image size determining circuit, for determining whether or not the content of said counter coincides with the first time period, to thereby generate the horizontal start timing signal when the content of said counter coincides with the first time period.

7. An apparatus as set forth in claim 3, wherein said vertical timing generating circuit comprises:
a counter for counting the horizontal synchronization signal, said counter being cleared by the vertical synchronization signal; and
a coincidence circuit, connected to said counter and said image size determining circuit, for determining whether or not the content of said counter coincides with the second time period, to thereby generate the vertical start timing signal when the content of said counter coincides with the second time period.

* * * * *

UNITED STATES PATENT AND TRADEMARK OFFICE
CERTIFICATE OF CORRECTION

PATENT NO. : 5,406,308
DATED : April 11, 1995
INVENTOR(S) : Tatsuya SHIKI

It is certified that error appears in the above-indentified patent and that said Letters Patent is hereby corrected as shown below:

Col 4, line 1, delete "2-1639" and insert --21-639--.

Col. 5, line 62, delete "COUT" and insert --CONT--.

Signed and Sealed this

Eighteenth Day of July, 1995

*Attest:*

BRUCE LEHMAN

*Attesting Officer*     *Commissioner of Patents and Trademarks*